(12) United States Patent
Yazdi et al.

(10) Patent No.: US 10,938,296 B2
(45) Date of Patent: *Mar. 2, 2021

(54) RIPPLE DETECTION AND CANCELLATION FOR VOLTAGE REGULATOR CIRCUITS

(71) Applicant: SHENZHEN GOODIX TECHNOLOGY CO., LTD., Shenzhen (CN)

(72) Inventors: Siavash Yazdi, San Diego, CA (US); Ahmed Emira, San Diego, CA (US)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/790,763

(22) Filed: Feb. 14, 2020

(65) Prior Publication Data

US 2020/0186023 A1    Jun. 11, 2020

Related U.S. Application Data

(63) Continuation of application No. 16/392,569, filed on Apr. 23, 2019, now Pat. No. 10,608,524, which is a
(Continued)

(51) Int. Cl.
*H02M 1/15*    (2006.01)
*H02M 3/158*    (2006.01)

(52) U.S. Cl.
CPC ............. *H02M 1/15* (2013.01); *H02M 3/158* (2013.01)

(58) Field of Classification Search
CPC ........ H02M 1/14; H02M 1/143; H02M 1/146; H02M 1/15; H02M 3/156; H02M 3/158
See application file for complete search history.

(56) References Cited

U.S. PATENT DOCUMENTS 7,046,527 B2 *   5/2006  West ................. H02M 7/53875
                                                        363/41
7,233,130 B1 *   6/2007  Kay ....................... H02M 1/143
                                                        323/222
(Continued)

FOREIGN PATENT DOCUMENTS

EP          1962413 A1    8/2008

*Primary Examiner* — Matthew V Nguyen
(74) *Attorney, Agent, or Firm* — Kilpatrick Townsend & Stockton LLP

(57) ABSTRACT

Techniques are described for ripple detection and cancellation in switching voltage regulator circuits. For example, in a switching voltage converter, a voltage is up-converted or down-converted by switching high side and low side switches and passed through a low-pass filter for averaging. While the act of switching can result in conversion of the voltage with good efficiency, it also typically generates ripples on the output voltage, which can be undesirable in some applications. Embodiments use the switching voltage, the output voltage, and a feed-forward loop to generate a current cancellation signal to have particular gain, timing, and polarity that effectively emulates the complement of the inductor ripple current. The cancellation current signal can be injected into the output node, such that the cancellation current signal sums with the inductor ripple current at the output node, thereby at least partially cancelling the effect of the inductor ripple current.

20 Claims, 5 Drawing Sheets

Related U.S. Application Data continuation of application No. 16/125,675, filed on Sep. 8, 2018, now Pat. No. 10,298,114.

(56) References Cited

U.S. PATENT DOCUMENTS

| | | | | |
|---|---|---|---|---|
| 8,633,766 B2* | 1/2014 | Khlat | ............... | H03F 3/45475 |
| | | | | 330/127 |
| 9,201,438 B2* | 12/2015 | MacLean | ............ | H02M 3/1588 |
| 9,400,295 B2* | 7/2016 | Li | ............ | G01R 21/00 |
| 10,298,114 B1* | 5/2019 | Yazdi | ............ | H02M 3/158 |
| 10,608,524 B1* | 3/2020 | Yazdi | ............ | H02M 1/15 |
| 2006/0034103 A1* | 2/2006 | West | ............ | H02M 7/493 |
| | | | | 363/39 |
| 2013/0106378 A1* | 5/2013 | Khlat | ............ | H02M 1/15 |
| | | | | 323/282 |
| 2014/0252973 A1* | 9/2014 | Liu | ............ | H02M 1/42 |
| | | | | 315/200 R |
| 2014/0333281 A1* | 11/2014 | Li | ............ | G06F 1/3203 |
| | | | | 323/318 |
| 2017/0215238 A1* | 7/2017 | Kim | ............ | H02M 1/12 |
| 2018/0248472 A1* | 8/2018 | Qiu | ............ | H05B 45/355 |

\* cited by examiner

RIPPLE DETECTION AND CANCELLATION FOR VOLTAGE REGULATOR CIRCUITS

CROSS-REFERENCES TO RELATED APPLICATIONS

This application is a continuation of U.S. application Ser. No. 16/392,569, for "RIPPLE DETECTION AND CANCELLATION FOR VOLTAGE REGULATOR CIRCUITS" filed on Apr. 23, 2019, which is a continuation of U.S. application Ser. No. 16/125,675, for "RIPPLE DETECTION AND CANCELLATION FOR VOLTAGE REGULATOR CIRCUITS" filed on Sep. 8, 2018. Both applications are hereby incorporated by reference in their entireties for all purposes.

FIELD OF THE INVENTION

The present invention relates generally to voltage regulator circuits. More particularly, embodiments of the present invention relate to ripple detection and cancellation for voltage regulator circuits.

BACKGROUND OF THE INVENTION

Voltage converters are used to provide stable supply voltages to a large variety of electronic products. In switching voltage converters, voltage can be up-converted and/or down-converted by switching high-side and low-side switches; and the switched voltage can be passed through a low pass filter network for averaging. The filtered voltage is then the output voltage of the converter. Typically, while such switching can provide efficient voltage conversion, the switching also manifests ripple on the output voltage. For example, the switched voltage causes current to flow through a filtering inductor, resulting in an inductor current that includes a ripple current riding on a load current. When the inductor current flows through a load of the filtering network, the voltage across the load (the output voltage of the regulator) similarly manifests a ripple voltage riding on the load voltage.

Some applications seek to minimize, or even eliminate, the ripple voltage. Some conventional approaches tend to use feedback to compare the output voltage with a stable, constant reference voltage. For example, the output voltage can be coupled with the output of a low-dropout (LDO) regulator and with one of its inputs, while the other input of the LDO regulator can be coupled with a stable reference voltage. Such a feedback loop can effectively regulate the ripple out of the output voltage, but such approaches have various limitations.

BRIEF SUMMARY OF THE INVENTION

Embodiments include circuits, devices, and methods for ripple detection and cancellation in switching voltage regulator circuits. Embodiments operate in context of a switching voltage converter, such as a buck converter, in which a voltage is up-converted or down-converted by switching high side and low side switches, and passing the switched voltage through a low-pass filter for averaging. While the act of switching can result in conversion of the voltage with good efficiency, it also typically generates ripples on the output voltage, which can be undesirable in some applications. Embodiments use the switching voltage, the output voltage, and a feed-forward loop to generate a current cancellation signal to have particular gain, timing, and polarity that effectively emulates the complement of the inductor ripple current. The cancellation current signal can be injected into the output node, such that the cancellation current signal sums with the inductor ripple current at the output node, thereby at least partially cancelling the effect of the inductor ripple current.

According to one set of embodiments, a voltage regulator system is provided. The system includes: a switching regulator and a feed-forward loop. The switching regulator includes a switching network coupled with a filtering network, the switching network generating a switching voltage at a switching period, and the filtering network generating an output voltage at a regulator output node as a function of the switching voltage. The feed-forward loop includes a ripple detection subsystem and a ripple cancellation subsystem. The ripple detection subsystem is coupled with the switching regulator to generate a ripple characterization signal corresponding to a ripple voltage on the output voltage, the ripple voltage corresponding to a ripple current in the filtering network. The ripple cancellation subsystem is coupled with the ripple detection subsystem and the switching regulator to: generate a cancellation current to correspond to a complement of the ripple current, such that the cancellation current has an amplitude that is a function of the ripple characterization signal and a period corresponding to the switching period; and inject the cancellation current at the regulator output node to cancel at least a portion of the ripple current.

According to another set of embodiments, a method of ripple cancellation is provided for an output voltage generated at a regulator output node by a switching regulator as a function of a switching voltage having a switching period. The method includes: generating a ripple characterization signal corresponding to a ripple voltage on the output voltage, the ripple voltage corresponding to a ripple current originating in a filtering network of the switching regulator; generating a cancellation current to correspond to a complement of the ripple current, such that the cancellation current has an amplitude that is a function of the ripple characterization signal and a period corresponding to the switching period; and injecting the cancellation current at the regulator output node to cancel at least a portion of the ripple current.

According to another set of embodiments, a system is provided for cancelling ripple voltage on an output voltage generated at a regulator output node by a switching regulator as a function of a switching voltage having a switching period. The system includes: means for generating a ripple characterization signal that characterizes a ripple current at the regulator output node, the ripple current corresponding to the ripple voltage; and means for injecting a cancellation current at the regulator output node to cancel at least a portion of the ripple current, the cancellation current generated to correspond to a complement of the ripple current, such that the cancellation current has an amplitude that is a function of the ripple characterization signal and a period corresponding to the switching period.

BRIEF DESCRIPTION OF THE DRAWINGS

The accompanying drawings, referred to herein and constituting a part hereof, illustrate embodiments of the disclosure. The drawings together with the description serve to explain the principles of the invention.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION OF THE INVENTION

In the following description, numerous specific details are provided for a thorough understanding of the present invention. However, it should be appreciated by those of skill in the art that the present invention may be realized without one or more of these details. In other examples, features and techniques known in the art will not be described for purposes of brevity.

Figure 1A:
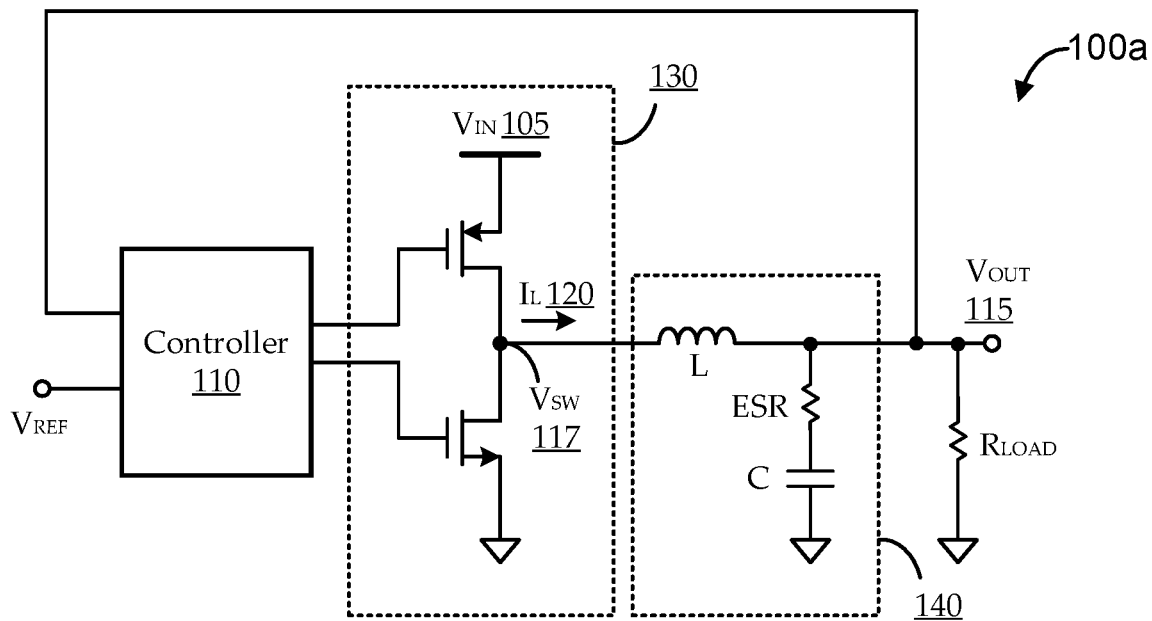
FIG. 1A shows an illustrative buck converter.

For the sake of context, FIG. 1A shows an illustrative buck converter 100*a*. The buck converter 100*a* can be used to receive a supply voltage ($V_{IN}$) 105 having a particular voltage and current, and to output a load voltage ($V_{OUT}$) 115 having a stepped down voltage and a stepped up current. As illustrated, the buck converter 100*a* includes a controller 110 coupled with a switching network 130 and a filtering network 140. The switching network 130 includes a high-side switch and a low-side switch coupled between a source voltage 105 and ground. The filtering network 140 includes an inductor and a filter capacitor, arranged as a low-pass "LC" filter. A voltage at the node between the high-side switch and the low-side switch can be considered the switching voltage ($V_{SW}$) 117.

While such switching can provide efficient voltage conversion, the switching can also manifest ripple on $V_{OUT}$ 115. When $V_{SW}$ 117 is applied across the filtering network 140, ripple on the inductor current (IL) 120 can cause a ripple on the voltage across the filter capacitor and load at the output of the filtering network 140. The voltage ripple corresponds to (e.g., is a function of) the current ripple, except that the voltage ripple can look different (e.g., have a different shape, delay, etc.) depending on whether the filter capacitor has a high or low quality factor. For example, as illustrated, the filter capacitor can be modeled as a capacitor in series with an equivalent series resistor (ESR). When the quality factor of the filter capacitor is very low, the ESR is very high (e.g., appearing to be mostly, or even purely, resistive); and when the quality factor of the filter capacitor is very high, the ESR is very low (e.g., appearing to be mostly, or even completely, capacitive).

Figure 1B:
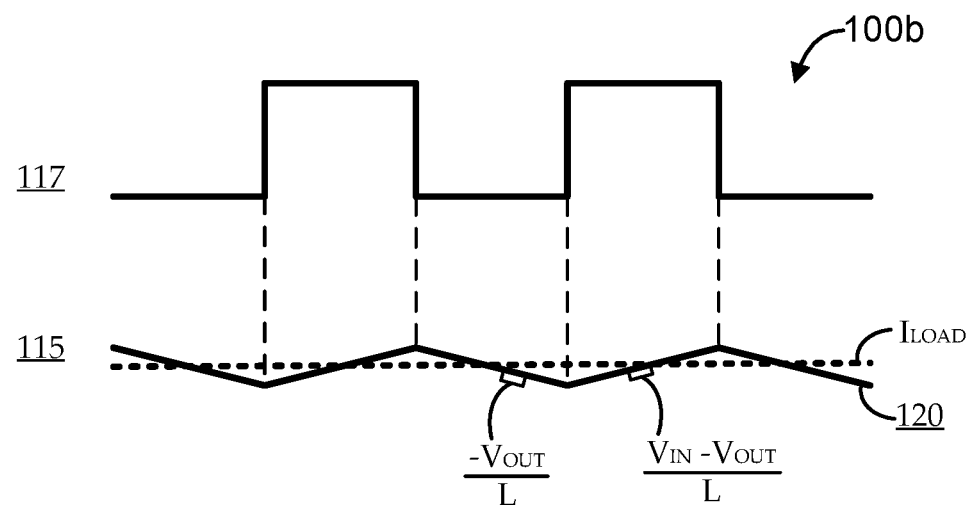
FIG. 1B shows illustrative waveforms for the illustrative buck inverter of FIG. 1A.

For the sake of illustration, FIG. 1B shows illustrative waveforms 100*b* for $V_{SW}$ 117 and IL 120 in the illustrative buck inverter 100*a* of FIG. 1A. As illustrated, $V_{SW}$ 117 is typically a square wave with any suitable duty cycle (a 50-percent duty cycle is shown). When $V_{SW}$ 117 is high, IL 120 slowly increases in a substantially linear fashion having a slope of approximately $(V_{IN}-V_{OUT})/L$, where L is the inductance of the filter inductor. When $V_{SW}$ 117 is low, IL 120 slowly decreases in a substantially linear fashion having a slope of approximately $(-V_{OUT})/L$.

Embodiments provide novel approaches for using a feed-forward loop to detect and cancel ripple on the output voltage of switching voltage regulator circuits. The switching voltage, the output voltage, and a feed-forward loop can iteratively generate and tune a current cancellation signal to have particular gain, timing, and polarity that effectively emulates the complement of the inductor ripple current. The cancellation current signal can be injected at the output of the voltage regulator circuit, such that the cancellation current at least partially cancels the effect of the inductor ripple current.

Figure 2:
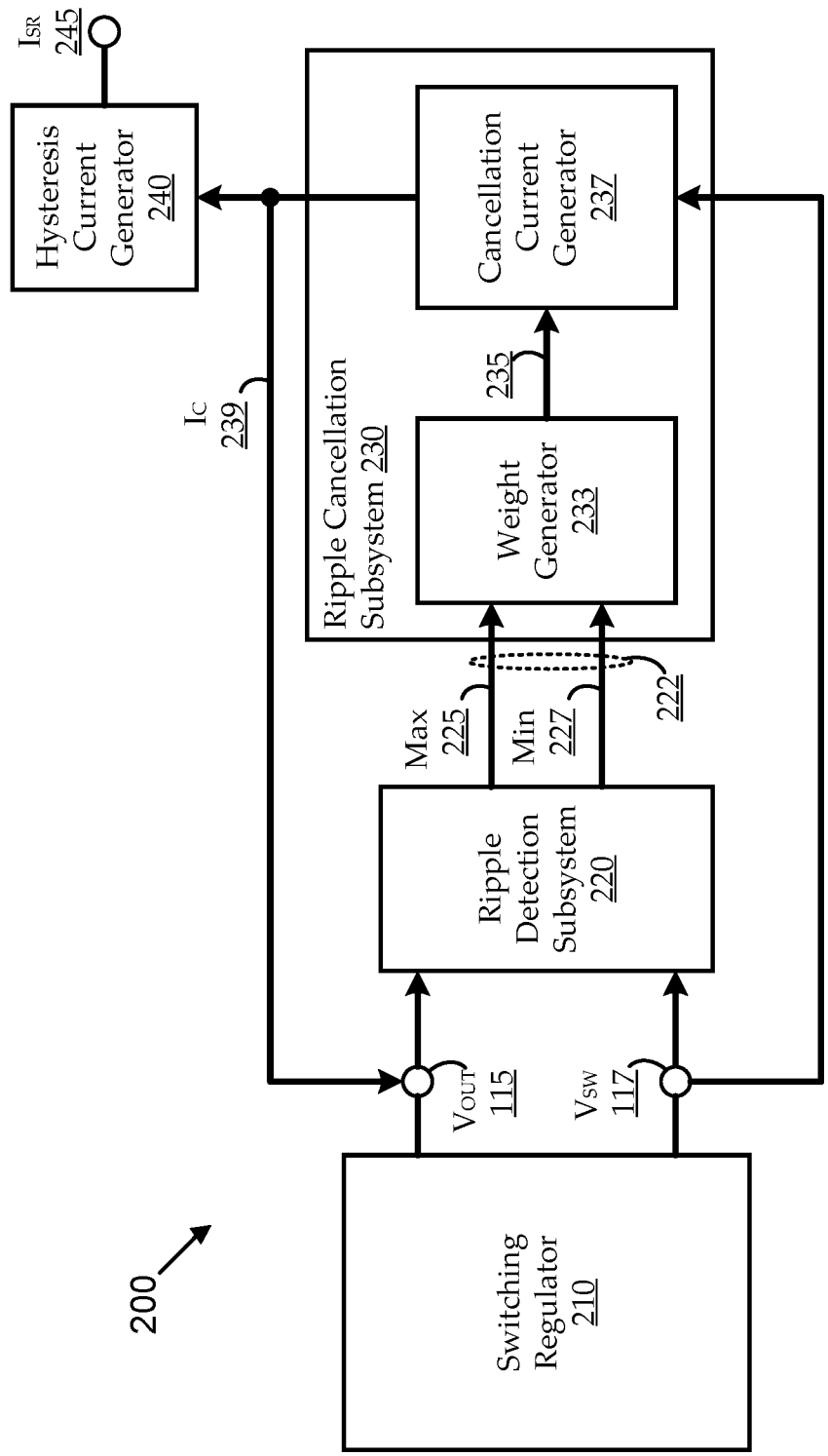
FIG. 2 shows an illustrative voltage regulator system, according to various embodiments.

FIG. 2 shows an illustrative voltage regulator system 200, according to various embodiments. As illustrated, the voltage regulator system 100 includes a switching regulator 210, a ripple detection subsystem 220, and a ripple cancellation subsystem 230. Embodiments of the ripple cancellation subsystem 230 can include a weight generator 233 and a cancellation current generator 237. As described with reference to FIG. 1A, embodiments of the switching regulator 210 can include a switching network coupled with a filtering network. The switching network can generate a switching voltage 117 at a switching period, and the filtering network can generate an output voltage 115 at a regulator output node as a function of the switching voltage 117.

The ripple detection subsystem 220 and the ripple cancellation subsystem 230 can be configured as a feed-forward loop. For example, the output of the feed-forward loop is fed to the output of the switching regulator 210. Embodiments of the ripple detection subsystem 220 are coupled with the switching regulator 210 to generate a ripple characterization signal 222 corresponding to a ripple voltage on the output voltage 115. The ripple voltage corresponds to a ripple current in the filtering network of the switching regulator 210. The ripple characterization signal 222 can be any suitable signal for characterizing the ripple voltage, and the ripple characterization signal 222 can include one or more independent signals. For example, as illustrated, the ripple characterization signal 222 can include a ripple max level signal 225 and a ripple min level signal 227.

Embodiments of the ripple cancellation subsystem 230 are coupled with the ripple detection subsystem 220 and the switching regulator 210. The ripple cancellation subsystem 230 can generate a cancellation current 239 to correspond to a complement of the ripple current, such that the cancellation current has an amplitude that is a function of the ripple characterization signal 222 and a period corresponding to the switching period of the switching voltage 117. In some embodiments, a weight generator 233 of the ripple cancellation subsystem 230 computes a gain weighting signal 235 as a function of the ripple characterization signal 222, such that the cancellation current 239 has an amplitude that is a function of the gain weighting 235. For example, the gain weighting signal 235 can be generated as a function of a difference between the ripple max level signal 225 and the ripple min level signal 227, so that the gain weighting signal 235 represents a peak-to-peak magnitude of ripple seen in the output voltage 115. The gain weighting signal 235 can then be used by a cancellation current generator 237 to generate the cancellation current 239 to have a peak-to-peak amplitude corresponding to the peak-to-peak magnitude of ripple seen in the output voltage 115 (e.g., when there is more ripple on the output voltage 115, the peak-to-peak amplitude of the cancellation current 239 is larger). The cancellation current 239 can then be injected at the output of the switching regulator 210, thereby cancelling at least a portion of the ripple current flowing into the output of the switching regulator 210.

Some implementations operate in context of hysteretic components, such as a hysteretic oscillator, or the like. Some such contexts can rely on the ripple current in a feedback loop (a hysteresis loop) for proper operation. In such cases, the voltage regulator system 200 can include a hysteresis current generator 240. The hysteresis current generator 240 can be implemented as an inverter with unity, or other gain, as desired. The hysteresis current generator 240 can take the generated cancellation current 239 as its input and can generate a simulated ripple current ($I_{SR}$) 245 at its output, for example, by inverting the cancellation current 239 to generate $I_{SR}$ 245. The $I_{SR}$ 245 can be fed back to a hysteresis loop, or any other circuit that relies on the ripple current for operation.

Though the various blocks of the voltage regulator system 200 are shown having particular inputs and outputs, and are shown coupled and arranged in a particular manner, other embodiments can include other inputs, outputs, couplings, arrangements, etc. For example the feed-forward loop can include any suitable means for generating a ripple characterization signal that characterizes a ripple current (e.g., directly, or indirectly, for example, by characterizing the ripple voltage) at an output node of the switching regulator 210. Further, the feed-forward loop can include any suitable means for injecting a cancellation current at the output node to cancel at least a portion of the ripple current. For example, the means for injecting can include any suitable means for generating the cancellation current to correspond to a complement of the ripple current, such that the cancellation current has an amplitude that is a function of the ripple characterization signal and a period corresponding to the switching period.

Figure 3:
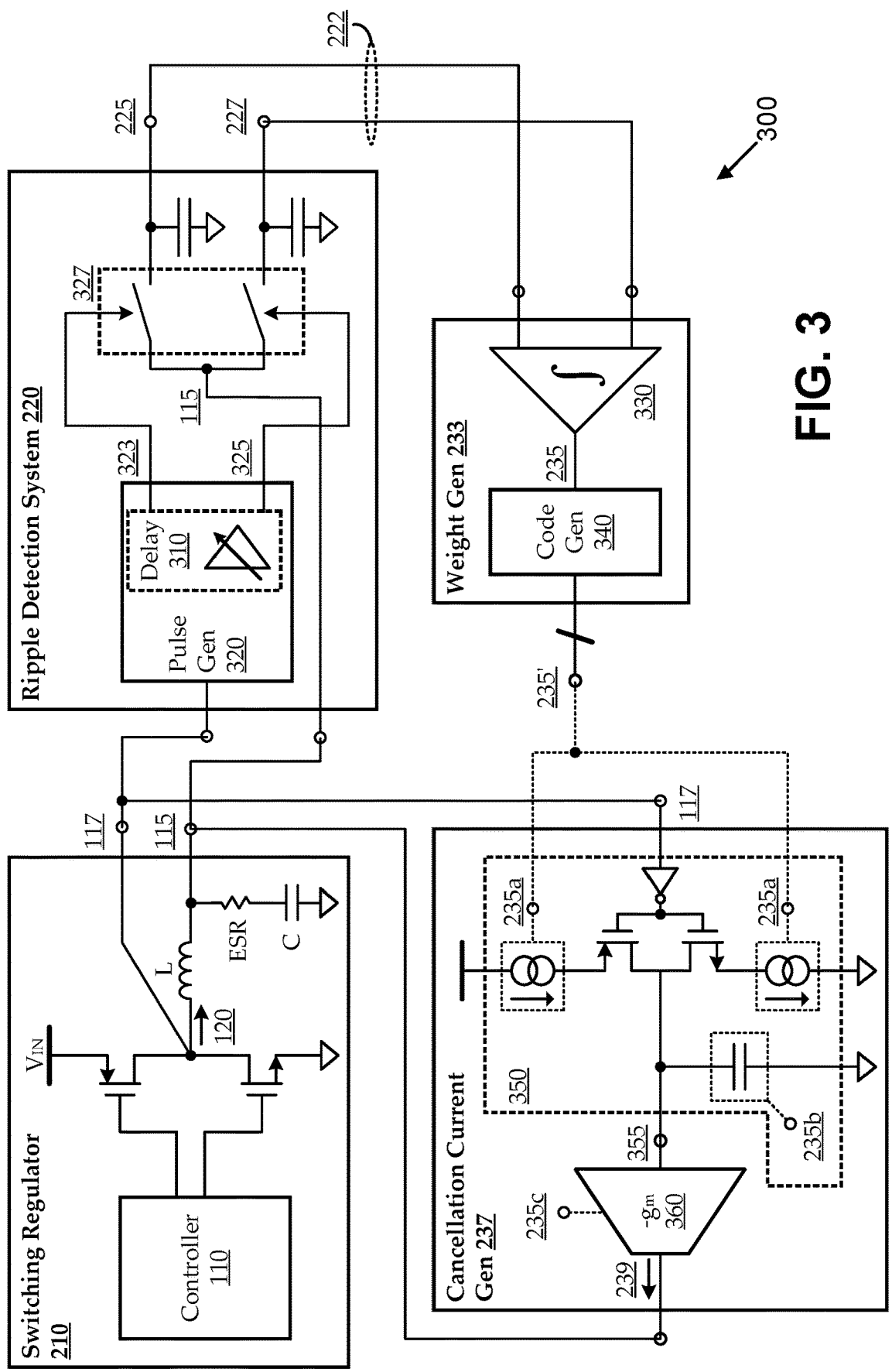
FIG. 3 shows a circuit block diagram of an illustrative voltage regulator system, according to various embodiments.

FIG. 3 shows a circuit block diagram of an illustrative voltage regulator system 300, according to various embodiments. The voltage regulator system 300 can be an implementation of the voltage regulator system 200 of FIG. 2. As illustrated, the voltage regulator system 300 includes illustrative implementations of a switching regulator 210, a ripple detection subsystem 220, a weight generator 233, and a cancellation current generator 237. The switching regulator 210 is illustrated generally as a buck converter. However, the switching regulator 210 can include any suitable type of switching regulator, such as any suitable type of step-up converter, step-down converter, etc.

As described above, the switching regulator 210 generally generates a switching voltage ($V_{SW}$) 117, which is passed through a filtering network to generate an output voltage ($V_{OUT}$) 115. The switching voltage 117 causes current to flow through an inductor (inductor current 120) in the filtering network, and the resulting inductor current manifests current ripple. This current affects development of a voltage across a load at the output of the switching regulator 210, which is the output voltage 115. The filter capacitor quality factor can vary from very high quality (i.e., where the equivalent series resistance (ESR) is almost zero) to low quality (i.e., where the ripple is dominated by the ESR of the capacitor). Current ripple on the inductor current 120 manifests as voltage ripple on the output voltage 115. Generally, the voltage ripple has periodicity corresponding to the switching period of the switching voltage 117, and peak-to-peak amplitude corresponding to the peak-to-peak amplitude of the current ripple.

Figure 4:
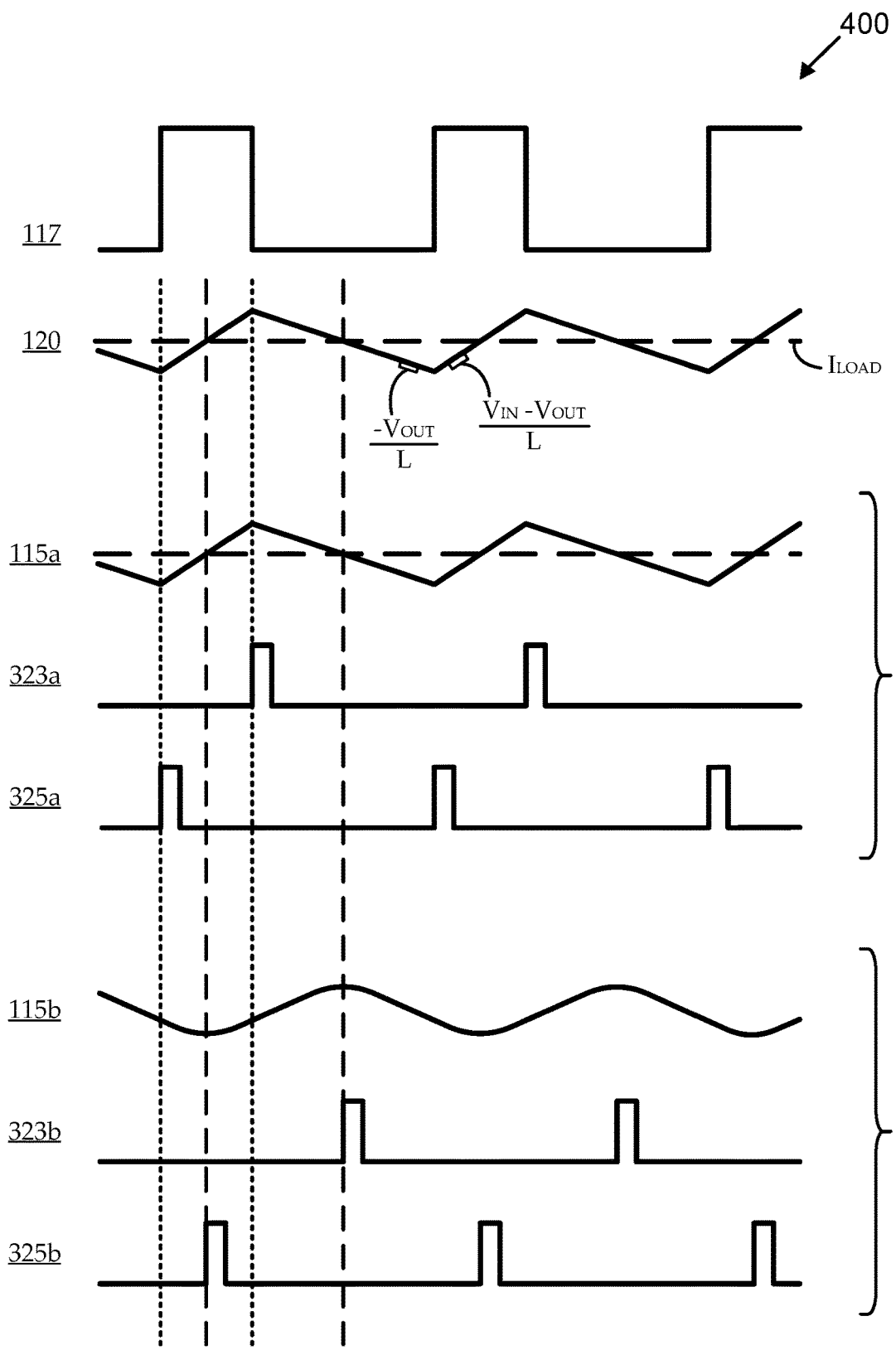
FIG. 4 shows illustrative waveforms for various signals in the voltage regulator system.

For example, FIG. 4 shows illustrative waveforms for various signals in the voltage regulator system 300. The waveforms are intended to be illustrative and approximate for the purpose of clarifying the disclosure, and should not be construed as limiting the scope of embodiments. For example, $V_{SW}$ 117 is illustrated as an ideal square wave with an arbitrary duty cycle (illustrated as approximately 30 percent). Effectively, $V_{SW}$ 117 is at a first level (e.g., HIGH, or a level driven by a source voltage level, $V_{IN}$) for some first portion of each switching period, and $V_{SW}$ 117 is at a second level (e.g., LOW, or a level driven by a ground level) for some second portion of each switching period. While $V_{SW}$ 117 is HIGH, the inductor current 120 tends to increase in a substantially linear fashion at a slope of approximately $(V_{IN}-V_{OUT})/L$, where L is the inductance value of the inductor. While $V_{SW}$ 117 is LOW, the inductor current 120 tends to decrease in a substantially linear fashion at a slope of approximately $(-V_{OUT})/L$. This periodic increase and decrease in the inductor current 120 manifests as a current ripple riding on a load current (i.e., the current seen at the output load of the switching regulator 210).

As described above, the capacitor quality factor can vary, which can affect how the current ripple on the inductor current 120 manifests as voltage ripple on $V_{OUT}$ 115. For the sake of illustration, a first waveform is shown as $V_{OUT}$ 115a, representing the output voltage seen across a low quality factor capacitor (i.e., where the ripple is dominated by the ESR of the capacitor). In such a case, $V_{OUT}$ 115a has substantially the same shape and timing as the inductor current 120. For example, $V_{OUT}$ 115a includes a ripple voltage riding on a load voltage, and the ripple voltage is a triangle wave having maxima and minima that are aligned to the maxima and minima of the ripple on the inductor current 120. A second waveform is shown as $V_{OUT}$ 115b, representing the output voltage seen across a low-ESR capacitor. In such a case, $V_{OUT}$ 115b has different shape and timing from that of the inductor current 120. For example, $V_{OUT}$ 115b includes a ripple voltage riding on a load voltage, but the ripple voltage has a more rounded shape (the shape typically follows a periodic pattern of exponential growth followed by exponential decay) having maxima and minima that are delayed (e.g., by a quarter period, where the duty cycle is fifty percent) with respect to the maxima and minima of the ripple on the inductor current 120.

Returning to FIG. 3, the output voltage 115 and the switching voltage 117 can be inputs to the ripple detection subsystem 220. As illustrated, the ripple detection subsystem 220 can include a pulse generator 320 to generate, for each switching period of the switching voltage 117, a first pulse output 323 corresponding to the switching voltage 117 reaching a maximum level, and a second pulse output 325 corresponding to the switching voltage 117 reaching a minimum level. The ripple detection subsystem 220 can also include a detection switch 327, coupled with the pulse generator 320. The detection switch 327 can couple the regulator output node (i.e., the node at which output voltage 115 is measured) with a first detection output responsive to the first pulse output 323, and to couple the regulator output node with a second detection output responsive to the second pulse output 325. The ripple max level signal 225 is a voltage at the first detection output, and the ripple min level signal 227 is a voltage at the second detection output. For example, in each switching period, substantially when the switching voltage 117 goes HIGH, the pulse generator 320 generates the first pulse output 323, which couples the regulator output node with the first detection output, pulling the first detection output (i.e., and the ripple max level signal 225) up to the output voltage 115. In each switching period, substantially when the switching voltage 117 goes LOW, the pulse generator 320 generates the second pulse output 325, which couples the regulator output node with the second detection output (and decouples the regulator output node from the second detection output), pulling the second detection output (i.e., and the ripple min level signal 227) up to the output voltage 115.

In some embodiments, the pulse generator 320 includes a delay generator 310 to delay timing of at least one of the first pulse output 323 or the second pulse output 325 with respect to timing of the switching period. The delay generator 310 can be used to adapt the pulse generator 320 for use with high- or low-quality filter capacitors. For the sake of illustration, turning back to FIG. 4, illustrative waveforms are shown for the first pulse output 323 and the second pulse output 325 in cases of low- and high-quality capacitors. In a first case, corresponding to a low-quality capacitor (i.e., having a high ESR), the output voltage 115a is substantially aligned in time with the inductor current 120. As such, the maxima and minima of the output voltage 115a occur substantially contemporaneously with the transitions of the switching voltage 117. Accordingly, it is desirable for the pulse generator 320 to generate the first pulse output 323 and the second pulse output 325 substantially without any delay with respect to the timing of the switching voltage 117. However, in a second case, corresponding to a high-quality capacitor (i.e., having a low ESR), the output voltage 115b is delayed in time with respect to the inductor current 120 timing (e.g., in case of a capacitor having zero ESR, the output voltage 115b may be delayed by approximately one quarter of the switching period). As such, the maxima and minima of the output voltage 115b occur at some time subsequent to each transition of the switching voltage 117. Accordingly, it is desirable for the pulse generator 320 to generate the first pulse output 323 and the second pulse output 325 with appropriate delay with respect to the timing of the switching voltage 117, so that the timing of the first pulse output 323 and the second pulse output 325 correspond to the timing of the maxima and minima of the output voltage 115b. Notably, while each pulse output signal is shown as occurring immediately subsequent to an associated maximum or minimum, other implementations can generate the pulse output signals to occur immediately prior to, or at any other suitable time corresponding to, an associated maximum or minimum.

Returning again to FIG. 3, the ripple max level signal 225 and the ripple min level signal 227 generated by the ripple detection subsystem 220 (e.g., collectively, the ripple characterization signal 222) can be inputs to the weight generator 233. As illustrated, the weight generator 233 can include an integrator 330 and a code generator 340. The integrator 330 can compute a gain weighting signal 235 as a function of the difference between the ripple max level signal 225 and the ripple min level signal 227. The integrator 330 can be implemented in any suitable manner, for example as an operational amplifier configured as an integrator circuit, as an up/down counter (e.g., counting up when the ripple max level signal 225 is HIGH, and counting down when the ripple min level signal 227 is HIGH), etc. The code generator 340 can compute a gain code corresponding to the gain weighting signal 235. For example, the gain code 235' can be a digital value of any suitable number of bits corresponding to a magnitude of gain indicated by the output of the integrator 330. The gain code is labeled as gain code 235' to indicate that, as used herein, the "gain weighting signal" can refer to any suitable signal, including (but not limited to) the gain weighting signal 235 at the output of the integrator 330, or the gain code 235' at the output of the code generator 340.

Embodiments of the cancellation current generator 237 can include a cancellation voltage generator 350 and a transconductance amplifier 360. The cancellation voltage generator 350 can generate a cancellation voltage 355 responsive to the ripple characterization signal 222 and the switching period, such that the cancellation voltage 355 has a peak-to-peak amplitude that is a function of the ripple characterization signal 222 and a period corresponding to the switching period. For the sake of clarity, the node at which the cancellation voltage 355 is measured (the output node of the cancellation voltage generator 350, and the input node of the transconductance amplifier 360) is referred to as the transconductance input node.

As illustrated, the cancellation voltage generator 350 can include a load (illustrated as a capacitor) coupled between the transconductance input node and a ground node; a first current source switchably coupled (e.g., via a transistor or any other suitable switching component) between a source voltage node and the transconductance input node; and a second current source switchably coupled (e.g., via a transistor or any other suitable switching component) between the transconductance input node and the ground node. The switching of the current sources is controlled according to the switching voltage 117. In the illustrated implementation, the switching voltage 117 output from the switching regulator 210 can be coupled, via an inverter, to gates of each of a PMOS transistor and an NMOS transistor. The PMOS transistor is coupled between the first current source and the transconductance input node, and the NMOS transistor is coupled between the transconductance input node and the ground node. When the switching voltage 117 is HIGH, the gate voltages of the transistors are LOW due to the inverter; the PMOS transistor turns on, and the NMOS transistor turns off, thereby delivering constant current from the source voltage node to the transconductance input node via the first current source and charging the load capacitor. When the switching voltage 117 is LOW, the gate voltages of the transistors are HIGH due to the inverter; the PMOS transistor turns off, and the NMOS transistor turns on, thereby pulling constant current from the transconductance input node to the ground node via the second current source and discharging the load capacitor.

Accordingly, the cancellation voltage 355 at the transconductance input has substantially the shape and timing (e.g., period) of the ripple current on the inductor current 120. This cancellation voltage 355 is fed to the transconductance amplifier 360 (e.g., implemented as a voltage-controlled current source, or any other suitable linear transconductance stage), and the transconductance amplifier 360 generates the cancellation current 239 as a function of the cancellation voltage 355. Accordingly, the cancellation current 239 at the transconductance output also has substantially the shape and timing (e.g., period) of the ripple current on the inductor current 120. As illustrated, the transconductance amplifier 360 can have negative gain (indicated as $-g_m$), such that the cancellation current 239 has opposite polarity from that of the ripple current at the output of the switching regulator 210.

Embodiments of the cancellation current generator 237 include one or more inputs coupled with the gain weighting signal 235 (e.g., gain code 235') at the output of the weight generator 233. In some implementations, the gain weighting signal 235 is used to adjust the magnitude of constant current supplied by one or both of the first and second current sources in the cancellation voltage generator 350. In other implementations, the gain weighting signal 235 is used to adjust the capacitance of the load capacitor in the cancellation voltage generator 350. In other implementations, the gain weighting signal 235 is used to adjust the gain of the transconductance amplifier 360. In any of those implementations, the gain weighting signal 235 adjusts the peak-to-peak amplitude of the cancellation current 239 (either directly at the transconductance amplifier 360, or by adjusting the peak-to-peak amplitude of the cancellation voltage 355).

For example, the cancellation current generator 237 can operate on its own to generate a cancellation current 239 having an appropriate shape, timing, and polarity to cancel the ripple current at the output of the switching regulator 210. However, the peak-to-peak amplitude of the cancellation current 239 may not be properly tuned to cancel the ripple current. Accordingly, the ripple detection subsystem 220 and the gain weighting signal 235 can work together dynamically (e.g., iteratively and responsively) to adjust the gain of components of the cancellation current generator 237 via the feed-forward loop, thereby tuning the cancellation current 239 to have an appropriate peak-to-peak amplitude for cancelling the ripple current. If the ripple current at the output of the switching regulator 210 increases, the increase can be detected by the ripple detection subsystem 220 and reflected in the ripple characterization signal 222 (e.g., in the difference between the ripple max level signal 225 and the ripple min level signal 227). That effect on the ripple characterization signal 222 can cause an increase in the gain weighting indicated by the gain weighting signal 235 generated by the weight generator 233. The increased gain weighting can cause an increase in the peak-to-peak amplitude of the cancellation current 239, thereby responsively cancelling out the increased peak-to-peak amplitude of the ripple current.

As described above, some implementations operate in context of a hysteresis loop, which can rely on the ripple current for proper operation. In such cases, the generated cancellation current 239 can be used to generate a simulated ripple current ($I_{SR}$ 245 of FIG. 2). For example, the cancellation current 239 can be inverted to generate $I_{SR}$ 245, and $I_{SR}$ 245 can be fed back to the hysteresis loop.

Figure 5:
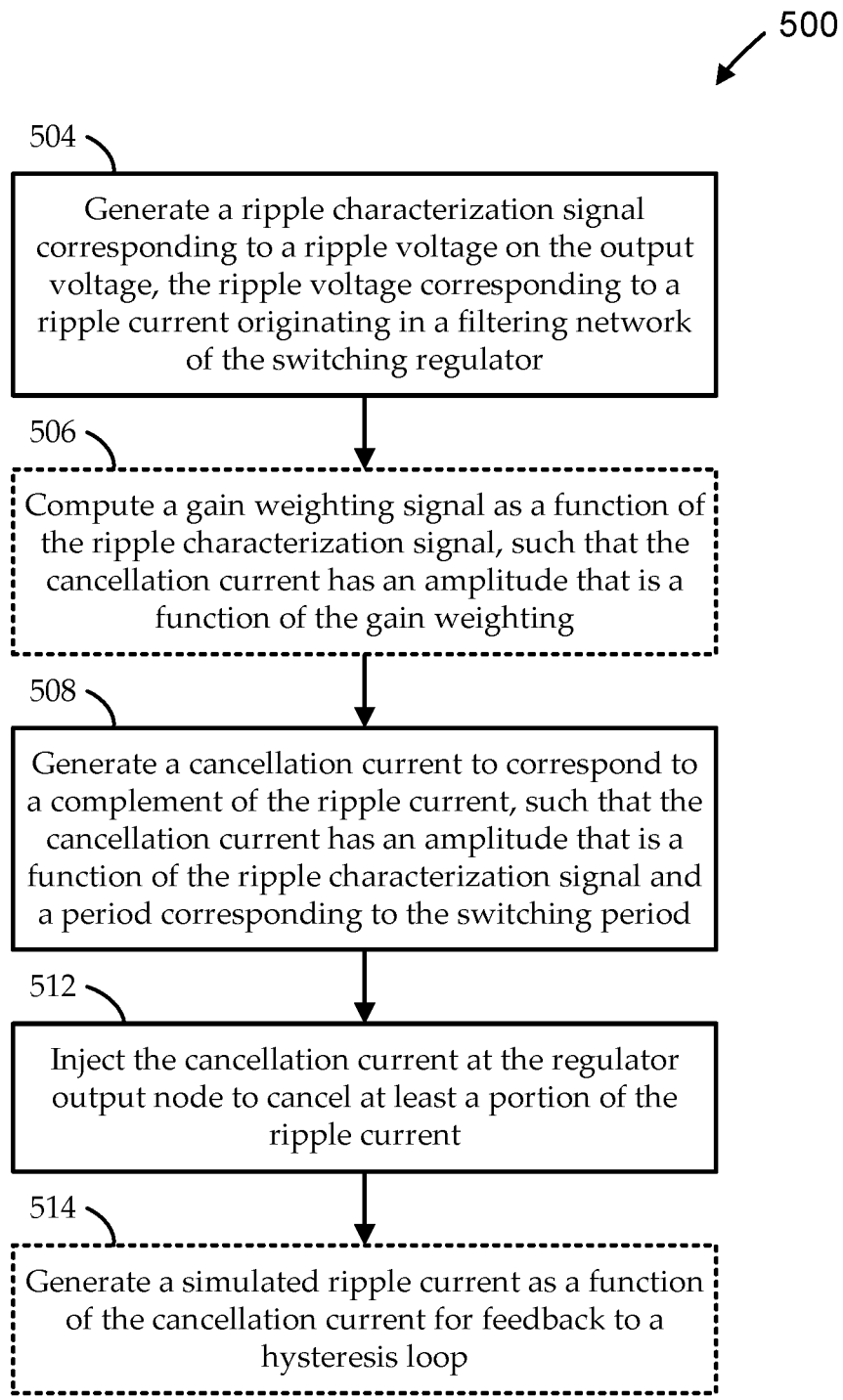
FIG. 5 shows a flow diagram of an illustrative method for ripple cancellation, according to various embodiments.

FIG. 5 shows a flow diagram of an illustrative method 500 for ripple cancellation for an output voltage generated at a regulator output node by a switching regulator as a function of a switching voltage having a switching period, according to various embodiments. Embodiments of the method 500 can begin at stage 504 by generating a ripple characterization signal corresponding to a ripple voltage on the output voltage, the ripple voltage corresponding to a ripple current originating in a filtering network of the switching regulator. For example, the ripple characterization signal can include a ripple max level signal and a ripple min level signal, such that the cancellation current is generated to have an amplitude that is a function of a difference between the ripple max level signal and the ripple min level signal. In some embodiments, generating the ripple characterization signal includes: generating, periodically for each switching period of the switching voltage, a first pulse output corresponding to the switching voltage reaching a maximum level, and a second pulse output corresponding to the switching voltage reaching a minimum level; coupling the regulator output node with a first detection output responsive to each first pulse output; and coupling the regulator output node with a second detection output responsive to each second pulse output, wherein the ripple max level signal is a voltage at the first detection output, and the ripple min level signal is a voltage at the second detection output.

In some embodiments, generating the ripple characterization signal includes delaying timing of at least one of the first pulse output or the second pulse output with respect to timing of the switching period. For example, the filtering network generates the output voltage at the regulator output node across a capacitor, which can have high or low quality factor. In such cases, the delaying can be such that the timing of the at least one of the first pulse output or the second pulse output is substantially aligned with the switching period when the capacitor has a low quality factor, and the timing of the at least one of the first pulse output or the second pulse output is temporally offset from the switching period (e.g., by up to a quarter of the switching period) when the capacitor has a high quality factor.

At stage 508, embodiments can generate a cancellation current to correspond to a complement of the ripple current, such that the cancellation current has an amplitude that is a function of the ripple characterization signal and a period corresponding to the switching period. In some embodiments, generating the cancellation current at stage 508 includes: generating a cancellation voltage responsive to the ripple characterization signal and the switching period, such that the cancellation voltage has an amplitude that is a function of the ripple characterization signal and a period corresponding to the switching period; and generating the cancellation current as a function of a transconductance applied to the cancellation voltage, such that the cancellation current has an amplitude and a period corresponding to amplitude and the period of the cancellation voltage, respectively. For example, the switching voltage is at a first level during a first portion of each switching period and is at a second level during a second portion of each switching period. In such a case, generating the cancellation voltage can include: delivering a first constant current to a transconductance input node when the switching voltage is at the first level to increase a voltage across a transconductance input load; and delivering a second constant current to a transconductance input node when the switching voltage is at the second level to decrease the voltage across the transconductance input load, wherein at least one of the first constant current, the second constant current, the transconductance input load, or the transconductance has a variable gain adjusted as a function of the ripple characterization signal.

In some embodiments, at stage 506, a gain weighting signal can be computed as a function of the ripple characterization signal. In such embodiments, the cancellation current generated at stage 508 can have an amplitude that is a function of the gain weighting. For example, the gain weighting signal can be computed at stage 506 as a function of the difference between the ripple max level signal and the ripple min level signal, and the cancellation current can be generated at stage 508 to have an amplitude that is a function of the gain weighting signal (i.e., that is a function of the difference between the ripple max level signal and the ripple min level signal). Some implementations compute a gain code corresponding to the gain weighting signal, such that the cancellation current has an amplitude that is a function of the gain code.

At stage 512, embodiments can inject the cancellation current at the regulator output node to cancel at least a portion of the ripple current. Some embodiments of the method, at stage 514, can use the generated cancellation current to generate a simulated ripple current (e.g., as the complement of the cancellation current). The cancellation current can be fed back to a hysteresis loop, or other appropriate feedback loop.

It will be understood that, when an element or component is referred to herein as "connected to" or "coupled to" another element or component, it can be connected or coupled to the other element or component, or intervening elements or components may also be present. In contrast, when an element or component is referred to as being "directly connected to," or "directly coupled to" another element or component, there are no intervening elements or components present between them. It will be understood that, although the terms "first," "second," "third," etc. may be used herein to describe various elements, components, these elements, components, regions, should not be limited by these terms. These terms are only used to distinguish one element, component, from another element, component. Thus, a first element, component, discussed below could be termed a second element, component, without departing from the teachings of the present invention. As used herein, the terms "logic low," "low state," "low level," "logic low level," "low," or "0" are used interchangeably. The terms "logic high," "high state," "high level," "logic high level," "high," or "1" are used interchangeably.

As used herein, the terms "a", "an" and "the" may include singular and plural references. It will be further understood that the terms "comprising", "including", "having" and variants thereof, when used in this specification, specify the presence of stated features, steps, operations, elements, aid/or components, but do not preclude the presence or addition of one or more other features, steps, operations, elements, components, and/or groups thereof. In contrast, the term "consisting of" when used in this specification, specifies the stated features, steps, operations, elements, and/or components, and precludes additional features, steps, operations, elements and/or components. Furthermore, as used herein, the words "and/or" may refer to and encompass any possible combinations of one or more of the associated listed items.

While the present invention is described herein with reference to illustrative embodiments, this description is not intended to be construed in a limiting sense. Rather, the purpose of the illustrative embodiments is to make the spirit of the present invention be better understood by those skilled in the art. In order not to obscure the scope of the invention, many details of well-known processes and manufacturing techniques are omitted. Various modifications of the illustrative embodiments, as well as other embodiments, will be apparent to those of skill in the art upon reference to the description. It is therefore intended that the appended claims encompass any such modifications.

Furthermore, some of the features of the preferred embodiments of the present invention could be used to advantage without the corresponding use of other features. As such, the foregoing description should be considered as merely illustrative of the principles of the invention, and not in limitation thereof. Those of skill in the art will appreciate variations of the above-described embodiments that fall within the scope of the invention. As a result, the invention is not limited to the specific embodiments and illustrations discussed above, but by the following claims and their equivalents.

What is claimed is:

1. A voltage regulator system comprising:
   a ripple detection system to couple with a regulator output node of a switching regulator to receive an output voltage generated by the switching regulator at the regulator output node as a function of a switching voltage having a switching period, the ripple detection system configured to generate a ripple characterization signal to comprise a ripple max level signal and a ripple min level signal by, for each switching period:
     first coupling the regulator output node to a first detection output responsive to detecting the switching voltage reaching a maximum level, a voltage at the first detection output being the ripple max level signal; and
     second coupling the regulator output node to a second detection output responsive to detecting the switching voltage reaching a minimum level, a voltage at the second detection output being the ripple min level signal; and
   a ripple cancellation subsystem coupled with the ripple detection system to:
     receive the ripple characterization signal;
     generate a cancellation current to have an amplitude that is a function of a difference between the ripple max level signal and the ripple min level signal, and to have a period corresponding to the switching period; and
     inject the cancellation current at the regulator output node to cancel at least a portion of a ripple current corresponding to the output voltage at the regulator output node.

2. The voltage regulator system of claim 1, wherein:
   the ripple detection system comprises a pulse generator to generate, for each switching period of the switching voltage, a first pulse output corresponding to the switching voltage reaching the maximum level, and a second pulse output corresponding to the switching voltage reaching the minimum level,
     the first coupling being responsive to the first pulse output; and
     the second coupling being responsive to the second pulse output.

3. The voltage regulator system of claim 2, wherein the ripple detection system further comprises a detection switch coupled with the pulse generator to perform the first coupling responsive to the first pulse output, and to perform the second coupling responsive to the second pulse output.

4. The voltage regulator system of claim 2, wherein the pulse generator comprises a delay generator to delay timing of at least one of the first pulse output or the second pulse output with respect to timing of the switching period.

5. The voltage regulator system of claim 4, wherein:
   the switching regulator generates the output voltage at the regulator output node across a capacitor; and
   the delay generator is to delay timing of the at least one of the first pulse output or the second pulse output with respect to timing of the switching period to be substantially aligned with the switching period when an equivalent series resistance for the capacitor is very high, and to be temporally offset from the switching period when the equivalent series resistance for the capacitor is substantially zero.

6. The voltage regulator system of claim 2, further comprising:
   a weight generator having a code generator to compute a gain code corresponding to a gain weighting signal that is a function of the difference between the ripple max level signal and the ripple min level signal, such that the cancellation current has an amplitude that is a function of the gain code.

7. The voltage regulator system of claim 1, further comprising:
   a hysteresis current generator, coupled with the ripple cancellation subsystem, to generate a simulated ripple current as a function of the cancellation current.

8. The voltage regulator system of claim 7, wherein:
   the hysteresis current generator is an inverting amplifier having an input and an output, the inverting amplifier to generate the simulated ripple current at the output responsive to receiving the cancellation current at the input.

9. The voltage regulator system of claim 1, further comprising:
   a feed-forward loop comprising the ripple detection system and the ripple cancellation subsystem.

10. The voltage regulator system of claim 1, further comprising:
    the switching regulator having:
       a switching network to generate the switching voltage at the switching period; and
       a filtering network to generate the output voltage at the regulator output node as a function of the switching voltage.

11. The voltage regulator system of claim 1, further comprising:
    a weight generator to compute a gain weighting signal as a function of the ripple characterization signal, such that the cancellation current has an amplitude that is a function of the gain weighting signal.

12. The voltage regulator system of claim 1, wherein the ripple cancellation subsystem comprises:
    a cancellation voltage generator to generate a cancellation voltage responsive to the ripple characterization signal and the switching period, such that the cancellation voltage has an amplitude that is a function of the ripple characterization signal and a period corresponding to the switching period; and
    a transconductance amplifier, coupled with the cancellation voltage generator, to generate the cancellation current as a function of the cancellation voltage, such that the cancellation current has an amplitude and a period corresponding to amplitude and the period of the cancellation voltage, respectively.

13. The voltage regulator system of claim 12, wherein:
    the switching voltage is at a first level during a first portion of each switching period and is at a second level during a second portion of each switching period; and
    the cancellation voltage generator comprises:
       a load coupled between an input of the transconductance amplifier and a ground node;
       a first current source switchably coupled between a source voltage node and the input of the transconductance amplifier; and
       a second current source switchably coupled between the input of the transconductance amplifier and the ground node,
       such that a first constant current is delivered to the input of the transconductance amplifier from the source voltage node when the switching voltage is at the first level, and a second constant current is delivered from the input of the transconductance amplifier to the ground node when the switching voltage is at the second level.

14. The voltage regulator system of claim 13, further comprising:
    a weight generator to compute a gain weighting signal as a function of the ripple characterization signal,
    wherein the first current source, the second current source, the load, and/or the transconductance amplifier comprises a variable control adjusted responsive to the gain weighting signal, such that the cancellation current has an amplitude that is a function of the gain weighting.

15. A method for ripple cancellation in a voltage regulator system, the method comprising:
    generating a ripple characterization signal responsive to an output voltage at a regulator output node of a switching regulator, the output voltage generated by the switching regulator as a function of a switching voltage having a switching period, the ripple characterization signal generated to comprise a ripple max level signal and a ripple min level signal by, for each switching period:
       first coupling the regulator output node to a first detection output responsive to detecting the switching voltage reaching a maximum level, a voltage at the first detection output being the ripple max level signal; and
       second coupling the regulator output node to a second detection output responsive to detecting the switching voltage reaching a minimum level, a voltage at the second detection output being the ripple min level signal;
    generating a cancellation current to have an amplitude that is a function of a difference between the ripple max level signal and the ripple min level signal, and to have a period corresponding to the switching period; and
    injecting the cancellation current at the regulator output node to cancel at least a portion of a ripple current corresponding to the output voltage at the regulator output node.

16. The method of claim 15, wherein the generating the ripple characterization signal comprises:
    generating, for each switching period of the switching voltage, a first pulse output corresponding to the switching voltage reaching the maximum level, the first coupling being responsive to the first pulse output; and
    generating a second pulse output corresponding to the switching voltage reaching the minimum level, the second coupling being responsive to the second pulse output.

17. The method of claim 16, wherein the generating the ripple characterization signal comprises:
    delaying timing of the generating the first pulse output and/or the generating the second pulse output with respect to timing of the switching period.

18. The method of claim 15, further comprising:
    generating a simulated ripple current as a function of the cancellation current; and
    providing the simulated ripple current to a hysteretic component.

19. The method of claim 18, wherein generating the simulated ripple current comprises inverting and applying a unity gain to the cancellation current.

20. The method of claim 15, wherein the injecting cancels substantially all of the ripple current.

* * * * *